UNITED STATES PATENT OFFICE.

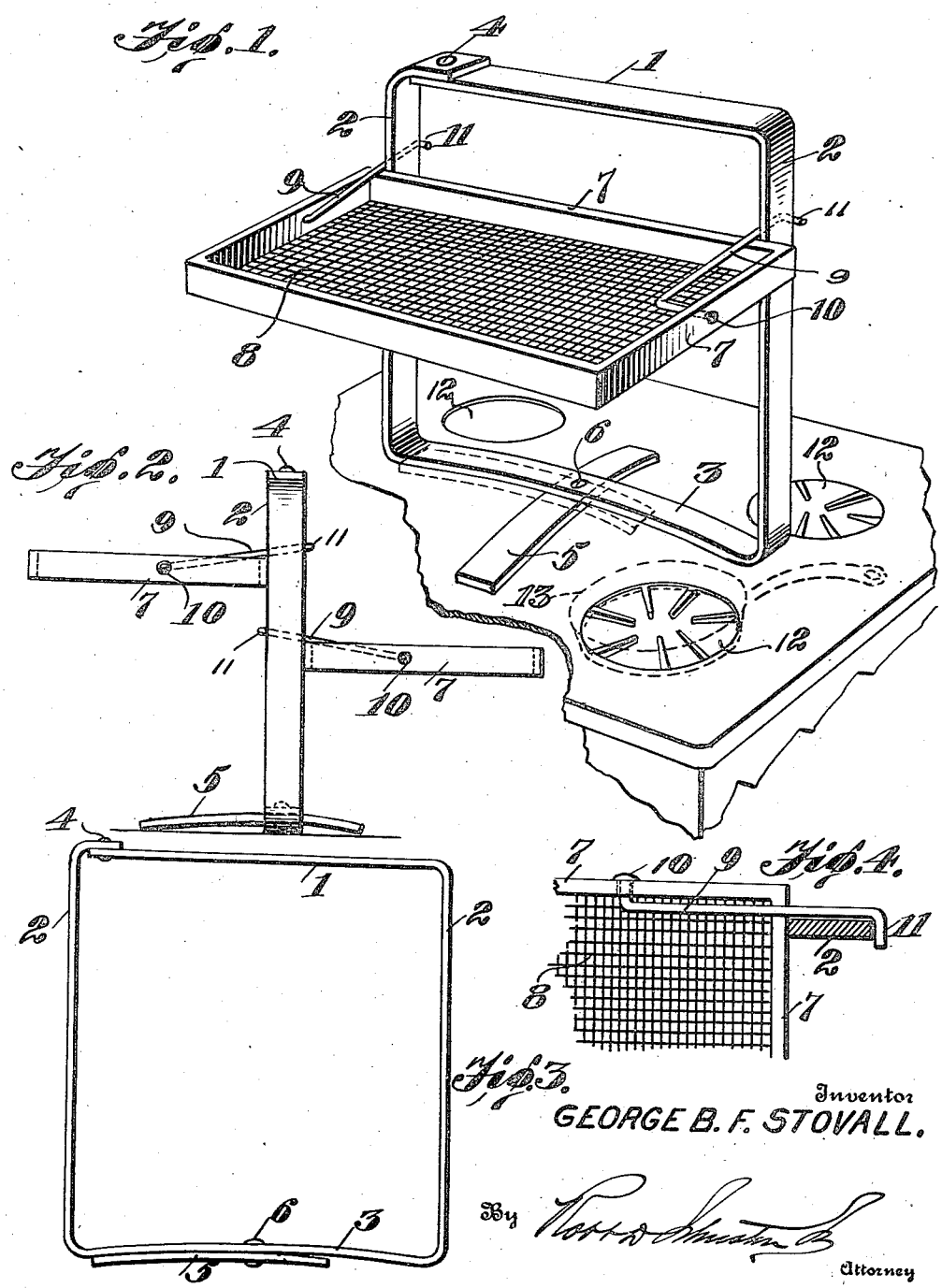

GEORGE B. F. STOVALL, OF BIRMINGHAM, ALABAMA.

FRUIT AND VEGETABLE DRIER.

1,293,237.  Specification of Letters Patent.  Patented Feb. 4, 1919.

Application filed April 23, 1918. Serial No. 230,254.

*To all whom it may concern:*

Be it known that I, GEORGE B. F. STOVALL, a citizen of the United States of America, residing at Birmingham, in the county of Jefferson and State of Alabama, have invented certain new and useful Improvements in Fruit and Vegetable Driers, of which the following is a specification.

This invention relates to a drying rack for fruit and vegetables which is extremely simple in design, compact in form, inexpensive in construction, and which has the very great advantage of being adapted to be set on the top of the stove without interference with the stove eyes or the presence of cooking vessels under the trays carrying the fruit or vegetables to be dried.

One object of my invention is to support the trays from a single upstanding rectangular frame having a bottom bracing foot or support and having trays adapted to be supported in overhung position from the sides of the frame.

A further object is to so design the trays that they can be adjusted to any desired height and disposed to either side and with any desired spacing without requiring any special construction of the frame to provide for those ends.

My invention also comprises a simple and novel arrangement for mounting the trays on the frame, this being done by providing the tray with rear swinging clamp hooks so arranged that they will engage the rear edge of the frame and cause the overbalanced weight on the tray to press its rear edge against the front edge of the frame and clamp it securely in position.

The other advantages and novel features of my invention will be better understood by reference to the accompanying drawings which form a part of this specification, and in which:—

Figure 1 presents the apparatus in perspective view mounted on a stove.

Fig. 2 is a side elevation of the apparatus.

Fig. 3 is a front elevation of the frame with the base support in folded position.

Fig. 4 is a detail view of a tray supporting clamp hook.

Similar reference numerals refer to similar parts throughout the drawings.

As illustrated, the frame is formed by bending a metal bar into a rectangular shape having a top member 1, vertical side members 2, and a bottom member 3, the ends of the bar being riveted together at 4 so as to hold the rectangular frame in shape. A base support 5 is connected by a pivot pin or loose rivet 6 to the middle of the bottom member 3, preferably being disposed under that member and pivoted intermediately so that in its operating position it stands at right angles thereto and projects a long way to the front and a short way to the rear of the frame which it thus serves to support in upright position. The bottom 3 is bent up slightly at its middle so that its ends will lie in the same plane with the bottom of the base support 5.

The trays for holding the fruit or vegetables to be dried are formed of any suitable material and comprise a marginal rim portion 7 having secured to its bottom surface in any suitable manner a foraminous or woven wire bottom 8. To each side of the tray near its rear edge I attach a clamp hook 9. These hooks have their forward ends 10 bent at right angles and inserted through and loosely riveted to the sides of the tray frame so that the hooks are free to swing vertically. These hooks are disposed to pass over and take a bearing on the rear member of the tray frame and their hook ends 11 are disposed in the same direction so that by a lateral movement of the tray they can be caused to simultaneously engage the rear edges of the frame sides. The overbalanced weight of the tray will cause the latter as held by the hooks to press and bind against the forward edges of the frame sides in such manner that the tray becomes clamped rigidly in position on the frame, but the tray may be readjusted or removed at any time by lifting its forward edge slightly which relaxes the clamping action of the hooks and then lifting the hooks so that they become released from the frame.

In operation, the base support 5 is swung outwardly from its folded position at right angles to the frame and trays, filled with the fruit or vegetables to be dried, are presented with a slight downward inclination to the frame so that their hooks can be caused to engage the rear edges of its sides, whereupon the rear of the tray is held while its overhung forward end is allowed to swing down until the tray clamps and binds itself in position on the frame. It will be observed that the base support will pass between the stove eyes 12 so as not to interfere with the use of the latter and the frame can be set at the rear or at a side of the stove so that any part of the latter may be used for cooking. The trays can be adjusted sufficiently high to permit the cooking vessels, such as 13 to be placed under them, so that cooking can proceed in ordinary course along with the drying operation and without sacrifice of stove space to the drying apparatus.

The trays can be overhung to front and rear of frame, so long as the frame is not thereby overbalanced.

This invention is not intended to be restricted in scope to the specific embodiment shown, but contemplates such modifications as come within the spirit and scope of the claims.

Having thus described my invention, what I claim as new and desire to secure by Letters Patent, is:—

1. In a drying apparatus, a frame formed by a metal bar bent to provide a base and sides disposed in the same vertical plane, a bottom brace to support the frame in upright position, and trays overhung from the frame above said brace.

2. In a drying rack, a frame comprising vertical side members and a connecting base, a brace member connected to the middle portion of the base and disposed at right angles thereto, and drying trays having means along one side thereof to mount them in overhung position on said side members above said brace.

3. In a drying apparatus, a substantially rectangular upright metallic frame having its parts lying in the same vertical plane, a supporting foot piece pivotally connected to the base of the frame, and drying trays having means to mount them in overhung position on the frame.

4. A drying apparatus for fruit and vegetables comprising a single upright frame formed by a bent metal bar shaped to provide vertical side members connected by base and top portions, a bottom brace member pivotally connected to the center of the frame base and adjustable horizontally to a position at right angles to the frame to support the latter in upright position, and trays having attachable fastenings adapted to engage the side members of the frame and support the trays in overhung position, substantially as described.

5. The combination with a tray support having upright members, of a drying tray having hinged hooks thereon adapted to engage the rear edge of said members and clamp the tray thereto in overhung position.

6. In combination, a tray support comprising upright members and a drying tray having two hook members pivotally connected thereto free to swing vertically, said hook members overhanging one edge of the tray and having their hook ends turned laterally in the same direction, said hook members being adapted to engage the supporting members and clamp the tray in overhung position therefrom with its said edge engaging the supporting members diametrically opposite the points of engagement of the hook members therewith, substantially as described.

7. The combination with a drying frame having spaced upright members, of a drying tray having two vertical swinging hooks hinged to project beyond one edge thereof far enough to permit said members to be clamped between said hooks and the said edge of the tray.

8. In combination, a supporting frame for vegetable drying trays comprising a base and upright members in combination with trays, and clamp means on the trays to engage the upright members and support the trays therefrom in overhung position.

In testimony whereof I affix my signature.

GEORGE B. F. STOVALL.

Witness:
NOMIE WELSH.